Sept. 6, 1966  SHIGETOSHI SHIMADA  3,271,255
EXTRACTION PROCESS AND PRODUCT OF HOLOTHURIOIDEA
Filed Nov. 18, 1963
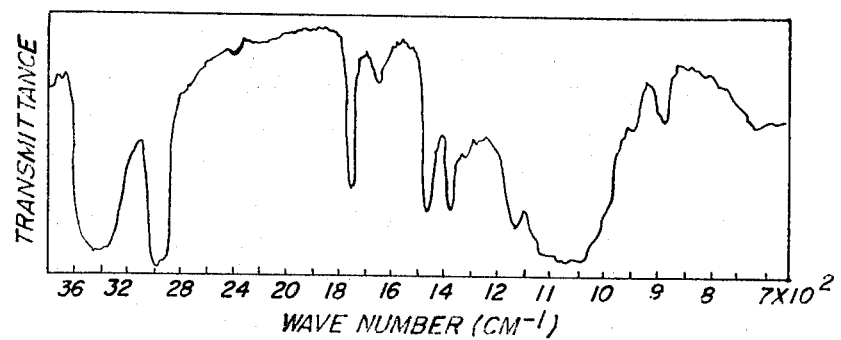
INFRARED ABSORPTION SPECTRUM OF HOLOTOXIN
*INVENTOR*
*SHIGETOSHI SHIMADA*

United States Patent Office
3,271,255
Patented Sept. 6, 1966

3,271,255
EXTRACTION PROCESS AND PRODUCT OF HOLOTHURIOIDEA
Shigetoshi Shimada, 4–138 Kohamanaka, Sumiyoshi-ku, Osaka, Japan
Filed Nov. 18, 1963, Ser. No. 324,496
Claims priority, application Japan, Nov. 30, 1962, 37/54,120
14 Claims. (Cl. 167—74)

This invention relates to new and useful improvements in the extraction of a product from Holothurioidea and more particularly seeks to provide such an extract characterized by antifungal activity.

Not many substances are known that have high antifungal activity and yet may be clinically useful against pathogenic fungi.

Accordingly, it is an object of this invention to provide a novel extraction process and product having high antifungal activity which is safe and effective in treating humans.

It has been found that the Holothurioidea class of the Echinodermata phylum contains a substance demonstrating a high antifungal activity against, for instance, pathogenic fungi that cannot be found in many other antifungal substances heretofore known.

The holothurian (sea cucumber) species is preferred because of its abundance in the sea adjacent to Japan. However, any Holothurioidea class animals may be used without restriction, if available, although the amount of the particular extract available will vary. Other animals for example, are *Stichopus japonicus* (Selenka), *Holothuria pervicax* (Selenka), (first two also readily available in Japan), *Stichopus chloronotus* (Brandt), *Holothuria monacaria* (Lesson), *Holothuria leucospilota* (Brandt), *Cucumaria frondosa* var. *japonica* (Semper), etc.

In the drawing, the sole figure is an infrared absorption spectrum of holotoxin.

For convenience, the extract disclosed herein has been named holotoxin by the inventor and will be so referred to hereinafter. The holothurian raw material may be used in the natural state, but it is advantageous to have it chopped and dried. Since holotoxin is soluble in a hydrophilic organic solvent, and the holothurian raw material contains other substances soluble in water and a lipophilic organic solvent, the following method is employed for obtaining holotoxin. First, the holothurian raw material is extracted with a lipophilic organic solvent to remove the substances soluble therein. The resulting residue is further extracted with a hydrophilic organic solvent, and then the residue obtained by distillation of the solvent is extracted with water to remove water soluble substances.

There is no restriction in the order of above treatments, e.g. it could be a hydrophilic organic solvent and then with a lipophilic organic solvent and water. In the case of treating first with a hydrophilic organic solvent, it is desirable to use the dried raw material.

Methanol, ethanol, ether, etc. are examples of hydrophilic organic solvents. Ethyl ether, chloroform, benzene, toluene, xylene, petroleum ether, petroleum benzine, ligroin, ethyl acetate, etc. are examples of lipophilic organic solvents. Various hydrophilic or lipophilic organic solvents may be used respectively in mixture.

The extraction may be carried out at room temperatures, but preferable under warming. The crude holotoxin obtained herein can be purified by recrystallization from methanol, ethanol, or by other conventional methods.

Holotoxin obtained by this invention is a colorless needle crystal, M.P. 250° C. (dec.), and possesses the elemental analytical values of C 51.90% and H 7.93%, but no nitrogen, sulfur and halogen. It is soluble in warm methanol and ethanol and moderately soluble at room temperature. It is insoluble in ethyl ether, chloroform, ethyl acetate, benzene, toluene, xylene, petroleum ether, petroleum benzine, and ligroin and barely soluble in water. The Liebermann-Burchard reaction is positive. The infrared spectral absorption (in Nujohl) exhibited a distinctive maximum region at 3300~3500 cm.$^{-1}$ and 1745 cm.$^{-1}$ (as shown at the end of the specification), and also the ultraviolet spectrum indicates no characteristic absorption. The specific rotation of the extract is $[\alpha]_D^{25}$ —44.6° (concd. 2.02 mg./ml. of dimethylformamide).

The holotoxin can be hydrolyzed with 5% sulfuric acid at 100° C., neutralized by sodium carbonate and then extracted with chloroform. The resulting water layer is chromatographed on paper (butanol:water:acetic acid=4:5:1). $R_f$-value indicates 0.38±0.02 and 0.16±0.02 (colored by the reagent of aniline-phosphoric acid which is positive for sugars).

Samples of crystalline holotoxin were dissolved for in vitro antifungal tests in an aqueous solution of 17.5% dimethylformamide to make a solution of 2 mg./ml. The resulting solution was serially diluted with sterile water and then agar plates were prepared. The test organisms were inoculated on each of the agar plates for observing their growth as follows:

TABLE I

| Organism | Minimum Inhibitory Concentration (mcg./ml.) | M. |
| --- | --- | --- |
| *Trichophyton asteroides* | 6.25 | 1 |
| *Trichophyton rubrum* | 6.25–1.56 | 1 |
| *Trichophyton interdigitale* | 6.25–1.56 | 1 |
| *Bacillus subtilis* | >100 | 2 |
| *Cornebacterium xerosis* | >100 | 2 |
| *Bacillus megaterium* | >100 | 2 |
| *Staphylococcus aureus* 209 P | >100 | 2 |
| *Staphylococcus* Pc-resistant R$_3$ | >100 | 2 |
| *Staphylococcus* Pc-resistant R$_4$ | >100 | 2 |
| *Escherichia coli* | >100 | 2 |
| *Proteus vulgaris* | >100 | 2 |
| *Pseudomonas aeruginosa* | >100 | 2 |
| *Mycobacterium tuberculosis* 607 | >100 | 2 |
| *Mycobacterium phlei* | >100 | 3 |
| *Candida albicans* | >100 | 3 |
| *Torula utilis* | 16.7 | 4 |
| *Saccharomyces cerevisiae* | 2.78 | 4 |
| *Penicillium chrysogenum* | 2.78 | 4 |
| *Aspergillus niger* | 16.7 | 5 |
| *Fusarium lini* | 16.7 | 5 |
| *Gibberella saubinetii* | 16.7 | 5 |
| *Glomerella cingulata* | 16.7 | 5 |
| *Helminthosporium avenae* | 16.7 | 6 |
| *Ophiobolus miyabeams* | 16.7 | 5 |
| *Piricularia oryzae* | 2.78 | 5 |

M.=medium used and culture conditions as follows:
(1) Sabouraud agar _____ 28° C., 96 hrs.
(2) Bouillon agar _____ 37° C., 15 hrs.
(3) Glycerin bouillon agar _____ 37° C., 39 hrs.
(4) Sabouraud agar _____ 28° C., 39.63 hrs.
(5) Potato agar _____ 28° C., 39.63 hrs.
(6) Potato agar _____ 28° C., 111 hrs.

These results demonstrate that holotoxin has high antifungal activity in-vitro on various fungi including pathogenic organisms of vegetable origin, but has only slight in-vitro activity against gram-positive, gram-negative and myco-bacteria.

An alcoholic, aqueous solution of 0.01% holotoxin was applied to affected skin once or several times daily, for 3 days at least and 4 weeks at most with practically no side effects and the following results:

TABLE II

| Disease | Excellent | Good | Nil | Total |
| --- | --- | --- | --- | --- |
| Pompholyx trichophytia | 16 | 14 | 5 | 35 |
| Trichophytia at the part of lanugo hairs | 1 | 2 | 1 | 4 |
| Tinea versicolor | 1 | 0 | 0 | 1 |
| Candida erosio interdigitalis | 0 | 1 | 0 | 1 |
| Total | 18 | 17 | 6 | 41 |

Excellent: Negative microscopic examination for fungi and complete disappearance of subjective and objective symptoms.
Good: Good improvement in subjective and objective symptoms.
Nil: No symptomatic changes.

These results demonstrate the clinical effectiveness of holotoxin in diseases of fungal origin.

Holotoxin can be medically used in various forms and an alcoholic aqueous solution is preferred, which is stable at room temperature for over one year. For external use, holotoxin in concentrations as low as 0.01% is effective and will give results even at 0.005%. Holotoxin may also be used in preparations mixed with other medicaments.

The following specific examples illustrate methods for preparing holotoxin:

*Example 1*

1 kg. of *Stichopus japonicus* (Selenka) was sliced and dried by heating. About 100 g. of the dried substance thus obtained was extracted continuously with benzene to remove benzene-soluble substances. 500 ml. of ethanol was added to the residue, warmed refluxively on a water bath for 6 hours and filtered with warming. The residue was similarly treated 3 more times with 300 ml. of new ethanol and all the filtrates combined, from which ethanol was then evaporated under reduced pressure. The residue was mixed with water as small in volume as possible, stirred, filtered or centrifuged and washed with a little more water. The crude holotoxin thus obtained was dissolved in a little ethanol under heating and decolorized with active carbon. Colorless needle crystals of holotoxin (87 mg.) were obtained by filtration after cooling.

*Example 2*

1 kg. of *Holothuria pervicax* (Selenka) was sliced and dried by heating. To 100 g. of the dried substance thus obtained, 500 ml. of methanol was added, warmed refluxively on a water bath for 6 hours, and with warming. The residue was similarly treated 3 more times with 300 ml. of new methanol and all the filtrates combined, from which methanol was then evaporated under reduced pressure. The extracted substance was dried, dissolved in 300 ml. of new methanol under heating, filtered and again evaporated under reduced pressure. The residue was stirred with 100 ml. of toluene and centrifuged or filtered by suction to obtain toluene-insoluble substances. 50 ml. of toluene was added to this toluene-insoluble residue and the above separation repeated. The toluene-insoluble substance thus obtained was stirred with a little water, filtered or centrifuged and washed with a little more water. The crude holotoxin thus obtained was treated in a little ethanol as described in Example 1 and crystals of holotoxin (153 mg.) were obtained.

I claim:

1. A process for preparing an extract of Holothurioidea comprising treating said Holothurioidea with a lipophilic organic solvent and removing material soluble therein from a first insoluble residue, treating said first insoluble residue with water and removing material soluble therein from a second insoluble residue, and treating said second insoluble residue with a hydrophilic organic solvent selected from the group consisting of methanol and ethanol and removing material insoluble therein from said extract.

2. The process of claim 1 wherein said lipophilic solvent is selected from the group consisting of ethyl ether, ethyl acetate, chloroform, benzene, toluene, xylene, petroleum ether, petroleum benzine and ligroin, and said hydrophilic solvent is selected from the group consisting of methanol and ethanol.

3. The process of claim 2 wherein said Holothurioidea is *Stichopus japonicus* (Selanka).

4. The process of claim 2 wherein said Holothurioidea is *Stichopus chloronotus* (Brandt).

5. The process of claim 2 wherein said Holothurioidea is *Holothuria pervicax* (Selanka).

6. The process of claim 2 wherein said Holothurioidea is *Holothuria monacaria* (Lesson).

7. The process of claim 2 wherein said Holothurioidea is *Holothuria leucospilota* (Brandt).

8. The process of claim 2 wherein said Holothurioidea is *Cucumaria frondosa* var. *japonica* (Semper).

9. A process for preparing an extract of Holothurioidea comprising treating said Holothurioidea with a lipophilic organic solvent selected from the group consisting of ethyl ether, ethyl acetate, chloroform, benzene, toluene, xylene, petroleum ether, petreloum benzine and ligroin, discarding the solute therefrom, treating the insoluble residue therefrom with a hydrophilic organic solvent selected from the group consisting of methanol and ethanol, discarding the insoluble residue therefrom, distilling said hydrophilic solvent to obtain the soluble residue therefrom, and treating said distilled residue with water and retaining as end product the insoluble residue thereof.

10. A process for preparing an extract of Holothurioidea comprising treating said Holothurioidea with a hydrophilic organic solvent selected from the group consisting of methanol and ethanol, discarding the insoluble residue therefrom, distilling said hydrophilic solvent to obtain the soluble residue therefrom, treating said distilled residue with a lipophilic organic solvent selected from the group consisting of ethyl ether, ethyl acetate, chloroform, benzene, toluene, xylene, petroleum ether, petroleum benzine and ligroin, discarding the solute therefrom, treating the insoluble residue therefrom with water and retaining as end product the insoluble residue thereof.

11. A process for preparing an extract of Holothurioidea comprising the following three steps in any order, (1) treating said Holothurioidea or subsequent retained fraction thereof with a lipophilic organic solvent and discarding material soluble therein, (2) treating said Holothurioidea or subsequent retained fraction thereof with a hydrophilic organic solvent selected from methanol or ethanol and discarding material insoluble therein, and (3) treating said Holothurioidea or subsequent retained fraction thereof with water and discarding material soluble therein.

12. An extract of Holothurioidea having the following properties:
  (a) effective in inhibiting fungal diseases;
  (b) positive in Liebermann-Burchard reaction;
  (c) moderately soluble in methanol and ethanol;
  (d) insoluble in ethyl ether, chloroform, acetone, ethyl acetate, benzene, toluene, xylene, petroleum ether, petroleum benzine, ligroin;
  (e) melting point at 250° C. (decompose);
  (f) the specific rotation $[\alpha]_D^{25}$ −44.6° (concd. 2.02 mg./ml. of dimethylformamide);
  (g) analyzing about 51.9% carbon and 7.9% hydrogen;
  (h) having a maximum absorption in the infrared region at 3300~3500 cm.$^{-1}$ and 1745 cm.$^{-1}$ (in Nujohl).

13. A method for treatment of fungal diseases comprising application of the extract of claim 12 to the diseased area.

14. A method for treatment of fungal diseases of the skin comprising application of an ethyl alcoholic, aqueous solution of more than 0.005% of the extract in claim 12 to the diseased skin area.

No references cited.

LEWIS GOTTS, *Primary Examiner.*

RICHARD L. HUFF, *Assistant Examiner.*